(12) United States Patent
Pulito et al.

(10) Patent No.: US 7,979,563 B2
(45) Date of Patent: Jul. 12, 2011

(54) METHOD AND SYSTEM FOR DYNAMIC CLIENT/SERVER NETWORK MANAGEMENT USING PROXY SERVERS

(75) Inventors: Brian Pulito, Lexington, KY (US); Brian Keith Smith, Raleigh, NC (US); Michael Joseph Spreitzer, Croton-On-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 11/840,205

(22) Filed: Aug. 16, 2007

(65) Prior Publication Data
US 2009/0049173 A1 Feb. 19, 2009

(51) Int. Cl.
*G06F 15/16* (2006.01)
*G06F 15/173* (2006.01)

(52) U.S. Cl. .................. 709/228; 709/227; 709/238
(58) Field of Classification Search .......... 709/213–216, 709/227–229
See application file for complete search history.

(56) References Cited

U.S. PATENT DOCUMENTS

| | | | | |
|---|---|---|---|---|
| 6,226,634 B1* | 5/2001 | Ogihara et al. | ............ | 1/1 |
| 6,226,684 B1* | 5/2001 | Sung et al. | ............ | 709/238 |
| 6,584,073 B1* | 6/2003 | Steele et al. | ............ | 370/254 |
| 6,874,031 B2* | 3/2005 | Corbeil | ............ | 709/229 |
| 6,877,095 B1* | 4/2005 | Allen | ............ | 713/182 |
| 6,974,031 B2* | 12/2005 | Kancsar et al. | ............ | 206/531 |
| 6,980,550 B1* | 12/2005 | Yip et al. | ............ | 370/392 |
| 7,069,268 B1* | 6/2006 | Burns et al. | ............ | 707/10 |
| 7,254,634 B1* | 8/2007 | Davis et al. | ............ | 709/228 |
| 7,490,164 B2* | 2/2009 | Srivastava | ............ | 709/238 |
| 2002/0069238 A1* | 6/2002 | Eard et al. | ............ | 709/202 |
| 2002/0112152 A1* | 8/2002 | VanHeyningen et al. | ..... | 713/151 |
| 2002/0160771 A1* | 10/2002 | Massie et al. | ............ | 455/426 |
| 2003/0037268 A1* | 2/2003 | Kistler | ............ | 713/310 |
| 2004/0107238 A1* | 6/2004 | Orton et al. | ............ | 709/200 |
| 2004/0125760 A1* | 7/2004 | Newberg et al. | ............ | 370/312 |
| 2006/0026290 A1* | 2/2006 | Pulito et al. | ............ | 709/227 |
| 2007/0150602 A1* | 6/2007 | Yared et al. | ............ | 709/227 |
| 2007/0192326 A1* | 8/2007 | Angal et al. | ............ | 707/10 |
| 2007/0204048 A1* | 8/2007 | Zhang | ............ | 709/227 |
| 2008/0195615 A1* | 8/2008 | Rowley | ............ | 707/8 |
| 2009/0025010 A1* | 1/2009 | Foottit et al. | ............ | 719/313 |

OTHER PUBLICATIONS

Rosenberg, et. al., RFC 3261. "SIP: Session Initiation Protocol", IETF, Jun. 2002.*

* cited by examiner

*Primary Examiner* — Brendan Higa
(74) *Attorney, Agent, or Firm* — Lee Law, PLLC; Christopher B. Lee

(57) ABSTRACT

The invention discloses a programming method and system for dynamic client/server network management using proxy servers, by allowing each active proxy server in an arrayed cluster to maintain an updated list of all other operating proxy servers in the cluster. When a client message requesting access to an application server is received by a clustered proxy server, the message may be forwarded to another proxy server (within the cluster) so that message (re)transmissions can pass through the same proxy server as the original message, allowing a proxy server to make consistent routing decisions (and other decisions) pertaining to that message.

20 Claims, 2 Drawing Sheets

METHOD AND SYSTEM FOR DYNAMIC CLIENT/SERVER NETWORK MANAGEMENT USING PROXY SERVERS

TECHNICAL FIELD

The invention relates to computer programming using proxy servers for client/server network management.

BACKGROUND

The client/server model of distributed computing operates to fulfill user needs by splitting functions between "client" tasks and "server" tasks performed by various computer hardware and software resources that are organized into a "network" for communication with each other, such as a local area network ("LAN") or a wide area network ("WAN") or the Internet. Using this model, a "client" program sends message requests to a "server" program in order to obtain data and/or processing action according to some communication "protocol" (i.e., a set of standard rules that determine how information is transmitted across a network) and the server completes the processing transaction by carrying out the request or deferring it to another time or by indicating that it cannot be fulfilled. This model allows clients and servers to be located (and to operate) independently of each other in a computer network, often using different hardware and operating systems appropriate to the function of each.

A "proxy server (or gateway)" is often used in handling client requests for transactions to be completed by other network "application servers" which are capable of performing the data processing actions required for the transaction but are not accessed directly by the client. If a processing transaction is not successfully completed upon initial transmission of a message, the client may send retransmissions of the message to an application server using an "arrayed cluster" (or group) of proxy servers. In that case, the cluster of proxy servers must route the retransmission(s) to the same application server as the original transmission, so that a retransmission is identical to the original transmission using the standards of RFC 3261. Current proxy server technology (such as that used with IBM WebSphere®) provides a partial solution to this problem by addressing (i.e., "hashing) the message to an array of application servers. This solution will work as long as the number (and the relative processing load(s) or "weight") of each of the clustered application servers does not change. However, a retransmitted proxy message may be routed to a different application server than originally intended if a server starts (or stops) functioning between retransmissions of a message (or if the "weight" of one of the servers changes).

SUMMARY OF THE INVENTION

The invention provides for dynamic client/server network management using proxy servers. Specifically, a programming method and system is used for allowing each active proxy server in an arrayed cluster to maintain an updated list of all other operating proxy servers in the cluster (referred to as a "ProxyClusterArray"). When a client message (requesting access to a networked application server) is received by a clustered proxy server, the message may be forwarded to another proxy server (within the cluster) so that message (re)transmissions can pass through the same proxy server as the original message, allowing a proxy server to make consistent routing (and other) decisions pertaining to that message.

When a proxy server receives a message from a user client requesting access to an application server in order to carry out a processing transaction, the proxy server "hashes" the message (by addressing it) to a "destination" proxy server. If the destination proxy server is not the one that initially received the message then it is forwarded to the original (destination) proxy server, which (locally) maintains processing "state" information for a sufficient period of time to determine if the message is a retransmission (and if so the destination proxy server can make the same processing decisions as were made for the original message). For example, the destination proxy server can identify (or "remember") the application server to which the original message was addressed (or "routed") in order to route retransmitted message(s) to the same application server. Each proxy server maintains such status information to indicate the processing decisions made for all messages it has handled (including identification of the application server to which a message has been routed) for a designated (i.e., maximum possible) interval of time between message retransmissions (referred to as MAX_STATE) which is adjusted to account for potential network transmission delays. This approach allows a proxy server to make consistent decisions for message (re)transmissions in a dynamically changing client/server network processing environment.

The present invention provides for dynamic client/server network management using proxy servers, by allowing each active proxy server in an arrayed cluster to maintain an updated list of all other operating proxy servers in the cluster.

The present invention provides a method and system that allows a user client to send a message requesting access to an application server via a clustered proxy server by using a proxy server to provide a message hash identifying the proxy server maintaining state information for that message.

The subject matter which is regarded as the invention is particularly pointed out and distinctly claimed in the concluding portion of the specification. The invention, however, together with further objects and advantages thereof, may best be understood by reference to the following description taken in conjunction with the accompanying drawings.

BRIEF DESCRIPTION OF THE DETAILED DRAWINGS

DETAILED DESCRIPTION OF THE PREFERRED EMBODIMENTS

Figure 1:
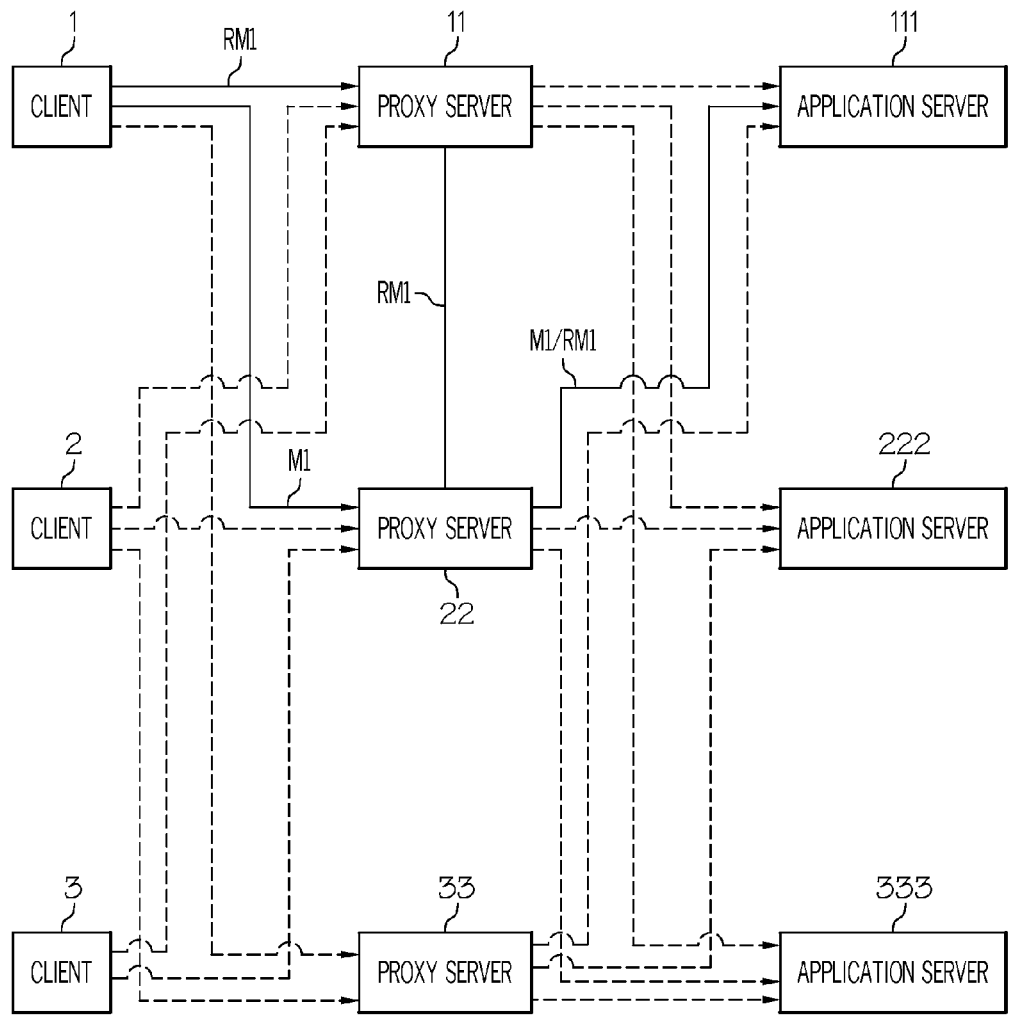
FIG. 1 illustrates a diagram outlining operation of a client/server network according to the invention.

FIG. 1 illustrates a diagram outlining the preferred operation of a client/server computer network utilizing SIP/UDP (Session Initiation Protocol over User Datagram Protocol) as the transmission protocol so that the illustrated connection topology can be used for transmitting proxied messages (containing data and/or instructions for a transaction to be processed) between a client and an application server located on the network; i.e., where a user client 1/2/3 sends a message to one of a cluster of proxy servers 11/22/33 that route the message to one of a cluster of application servers 111/222/333. In the example shown in FIG. 1 (a) message M1 is directly received from client 1 by proxy server 22; and (b) message RM1 (a retransmission of M1) is received by proxy server 11 and forwarded to proxy server 22 and then (in either case) the message is routed (i.e. load balanced) to application server 111.

Figure 2:
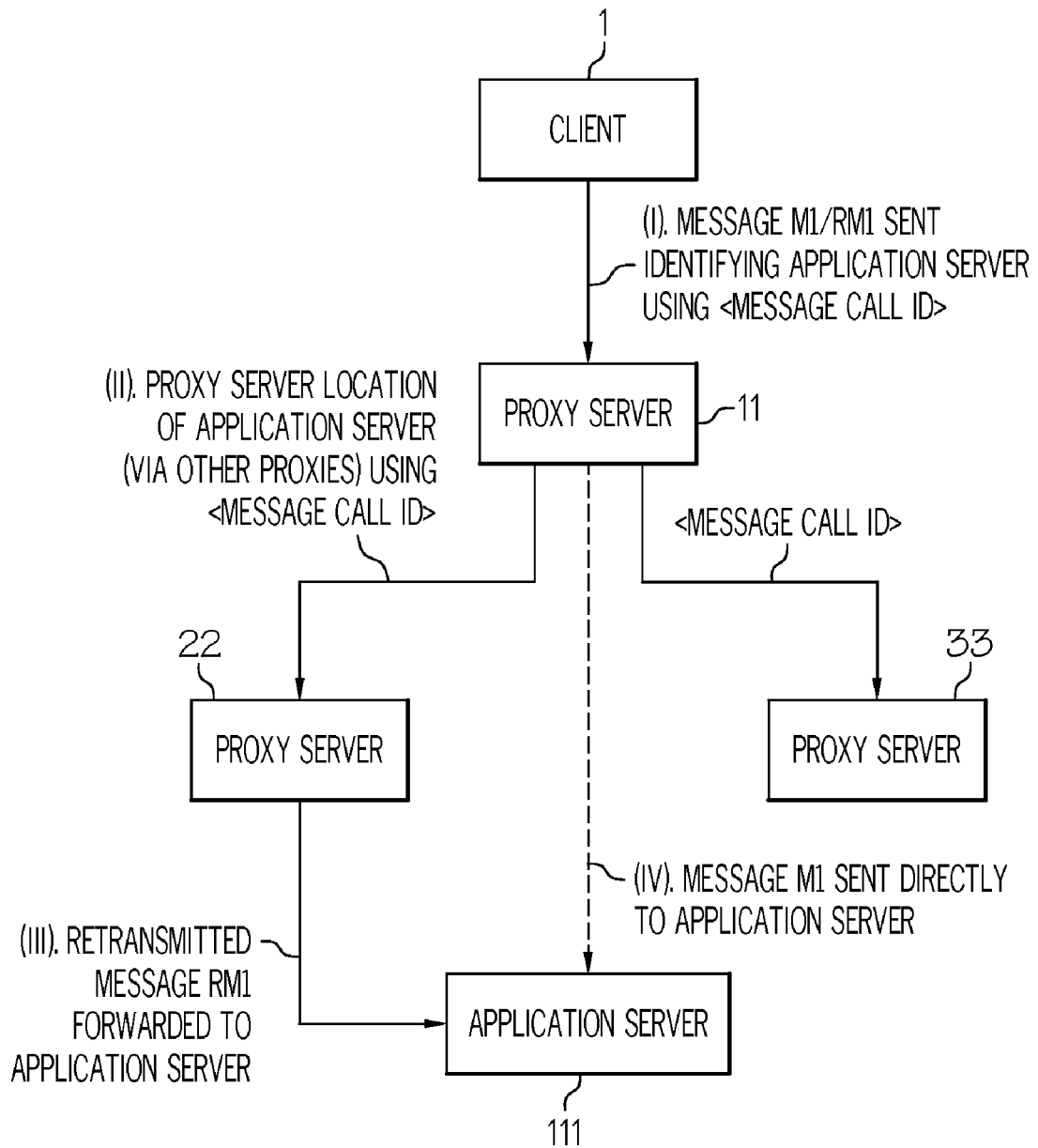
FIG. 2 illustrates a flowchart outlining operation of a client/server network according to the invention.

As shown in the flowchart of FIG. 2 at step (i), when a (dialog-initiating) client message M1/RM1 arrives at a proxy server 11 using SIP/UDP (or a similar) transmission protocol, the <message call ID> is preferably "hashed" and "modulized" (i.e., the remainder of dividing the hash value by the length of an array of choices is used) with each of the active ProxyClusterArray instances to determine the potential list of proxy servers 22 and/or 33 (each referred to as a "PotentialProxy") that may have processing state information relating to messag(es) with that call ID as shown in FIG. 2 step (ii). If the currently active proxy server 11 is in the list of Potential-Proxies, its local storage cache is checked for processing state information related to the message to determine if it is being retransmitted, and (if found) the message is processed locally by forwarding it directly to the application server 111 to which the original message was routed. Otherwise, the retransmitted message RM1 is forwarded to a PotentialProxy server that has not yet been queried (as determined from a list of "already visited" PotentialProxies kept in a private message header) until the proxy server 22 responsible for originally processing (and thus maintaining) the state information for that message is located and used for (re)routing the message to the application server 111 to which the original message M1 was routed (whereupon the private header is removed) as shown in FIG. 2 step (iii). If no state information for the message is held by any of the proxy servers in the list of PotentialProxies, the currently active proxy server 11 determined by the latest ProxyClusterArray creates state information and directly processes the message using the call ID (as described previously and as shown in FIG. 2 step (iv)). This creates the unlikely possibility that a message may pass through the same proxy server twice.

Whenever a new proxy server 33 is activated (or deactivated) a new ProxyClusterArray is activated (and becomes the "latest") and the (previously latest) array is then considered to "expire" (after the next MAX_STATE interval). Thus a message may be forwarded more than once between proxy servers for examination to determine if it is being retransmitted. However, in the normal case there is only a single listed server in the ProxyClusterArray to consider, and (N−1)/N (where N is the number of proxy servers) of the client messages will be forwarded once to another proxy server. In a preferred example of use of the invention with WebSphere, an "HAGroup" (High Availability Group) processing mechanism (based on "Virtual Synchrony" technology) is used to track the list(s) of active and expiring ProxyClusterArrays. When activated, each proxy server joins an HAGroup that corresponds to the cluster of which it is a member, so that Virtual Synchrony can ensure that each active proxy server is provided with the same updated list(s) of ProxyClusterArrays. If a proxy server purposefully stops its processing activity, it broadcasts its state information to the other proxy servers listed in the (currently active) ProxyClusterArray; however, if a proxy server terminates operation abnormally, the state information it possesses is lost. (It is possible to handle such a condition by replicating this state information, although this entails a processing performance cost.)

While certain preferred features of the invention have been shown by way of illustration, many modifications and changes can be made that fall within the true spirit of the invention as embodied in the following claims, which are to be interpreted as broadly as the law permits to cover the full scope of the invention, including all equivalents thereto.

What is claimed is:
1. A method comprising:
  determining, in response to receipt of a message at a proxy server in an arrayed proxy server cluster, a list of potential active proxy servers in the arrayed proxy server cluster with a potential of stored processing state information associated with the received message; and
  in response to determining that the proxy server is in the list of potential active proxy servers:
    determining that the proxy server is a last active proxy server in the list of potential active proxy servers based upon results of a comparison of a list of already visited proxy servers in a private header of the received message with the list of potential active proxy servers;
    determining whether processing state information associated with the received message is stored in a local cache storage device;
    in response to determining the processing state information associated with the received message is stored in the local cache storage device:
      determining that the received message comprises a retransmitted message; and
      forwarding the received message directly to an application server within a cluster of application servers to which an initial transmission of the message was forwarded; and
    in response to determining that the processing state information associated with the received message is not stored in the local cache storage device:
      determining that the message is an initial transmission of the received message;
      temporarily storing the processing state information associated with the received message in the local cache storage device; and
      forwarding the received message directly to the application server within the cluster of application servers.

2. The method of claim 1, further comprising maintaining the processing state information associated with the received message in the local cache storage device for a designated maximum interval of time for message retransmissions.

3. The method of claim 1, further comprising:
  maintaining a list of all other active proxy servers in the arrayed proxy server cluster;
  generating a new list of all other active proxy servers in the arrayed proxy server cluster in response to a new proxy server activation or a proxy server deactivation; and
  expiring the previous list of all other active proxy servers in the arrayed proxy server cluster in response to expiration of a next designated maximum state interval.

4. The method of claim 1, further comprising broadcasting the locally stored processing state information to the other active proxy servers in the arrayed proxy server cluster in response to a determination to deactivate the proxy server.

5. The method of claim 1, where, determining, in response to receipt of the message at the proxy server in the arrayed proxy server cluster, the list of potential active proxy servers in the arrayed proxy server cluster with the potential of stored processing state information associated with the received message comprises hashing a message identifier associated with the received message with a list of active proxy servers, where results of the hashing of the message identifier with each active proxy server in the list of active proxy servers indicates active proxy servers with the potential of stored processing state information associated with the received message.

6. The method of claim 5, further comprising in response to determining that the proxy server that received the message is not in the list of potential active proxy servers:
   adding the proxy server that received the message to the list of already visited proxy servers in the private header of the received message; and
   forwarding the received message to another active proxy server on the list of potential active proxy servers.

7. The method of claim 1, further comprising, in response to determining the processing state information associated with the received message is stored in the local cache storage device, removing the private header of the received message.

8. An apparatus, comprising:
   a local cache storage device; and
   a proxy server operable within an arrayed proxy server cluster and programmed to:
      determine, in response to receipt of a message at the proxy server, a list of potential active proxy servers in the arrayed proxy server cluster with a potential of stored processing state information associated with the received message; and
      in response to determining that the proxy server is in the list of potential active proxy servers:
         determine that the proxy server is a last active proxy server in the list of potential active proxy servers based upon results of a comparison of a list of already visited proxy servers in a private header of the received message with the list of potential active proxy servers;
         determine whether processing state information associated with the received message is stored in the local cache storage device;
         in response to determining the processing state information associated with the received message is stored in the local cache storage device:
            determine that the received message comprises a retransmitted message; and
            forward the received message directly to an application server within a cluster of application servers to which an initial transmission of the message was forwarded; and
         in response to determining that the processing state information associated with the received message is not stored in the local cache storage device:
            determine that the message is an initial transmission of the received message;
            temporarily store the processing state information associated with the received message in the local cache storage device; and
            forward the received message directly to the application server within the cluster of application servers.

9. The apparatus of claim 8, where the proxy server is further programmed to:
   maintain the processing state information associated with the received message in the local cache storage device for a designated maximum interval of time for message retransmissions.

10. The apparatus of claim 8, where the proxy server is further programmed to:
   maintain a list of all other active proxy servers in the arrayed proxy server cluster;
   generate a new list of all other active proxy servers in the arrayed proxy server cluster in response to a new proxy server activation or a proxy server deactivation; and
   expire the previous list of all other active proxy servers in the arrayed proxy server cluster in response to expiration of a next designated maximum state interval.

11. The apparatus of claim 8, where the proxy server is further programmed to broadcast locally stored processing state information to the other active proxy servers in the proxy cluster array in response to a determination to deactivate the proxy server.

12. The apparatus of claim 8, where, in being programmed to determine, in response to receipt of a message at a proxy server in an arrayed proxy server cluster, the list of potential active proxy servers in the arrayed proxy server cluster with the potential of stored processing state information associated with the received message, the proxy server is programmed to hash a message identifier associated with the received message with a list of active proxy servers, where results of the hash of the message identifier with each active proxy server in the list of active proxy servers indicates active proxy servers with the potential of stored processing state information associated with the received message.

13. The apparatus of claim 12, where the proxy server is further programmed to, in response to determining that the proxy server that received the message is not on the list of potential active proxy servers with the potential of stored processing state information associated with the received message:
   add the proxy server that received the message to a list of already visited proxy servers in a private header of the received message; and
   forward the received message to another active proxy server on the list of potential active proxy servers.

14. The apparatus of claim 8, where the proxy server is further programmed to, in response to determining the processing state information associated with the received message is stored in the local cache storage device, remove the private header of the received message.

15. A computer program product comprising a non-transitory computer readable storage medium including computer readable code, where the computer readable program code when executed on a computer causes the computer to:
   determine, in response to receipt of a message at a proxy server in an arrayed proxy server cluster, a list of potential active proxy servers in the arrayed proxy server cluster with a potential of stored processing state information associated with the received message; and
   in response to determining that the proxy server is in the list of potential active proxy servers:
   determine that the proxy server is a last active proxy server in the list of potential active proxy servers based upon results of a comparison of a list of already visited proxy servers in a private header of the received message with the list of potential active proxy servers;
   determine whether processing state information associated with the received message is stored in a local cache storage device;
   in response to determining the processing state information associated with the received message is stored in a local cache storage device;
   determine that the received message comprises a retransmitted message; and
   forward the received message directly to an application server within a cluster of application servers to which an initial transmission of the message was forwarded; and
   in response to determining that the processing state information associated with the received message is not stored in the local cache storage device:
   determine that the message is an initial transmission of the received message;

temporarily store the processing state information associated with the received message in the local cache storage device; and forward the received message directly to the application server within the cluster of application servers.

16. The computer program product of claim 15, where the computer readable program code when executed on the computer further causes the computer to maintain the processing state information associated with the received message in the local cache storage device for a designated maximum interval of time for message retransmissions.

17. The computer program product of claim 15, where the computer readable program code when executed on the computer further causes the computer to:

maintain a list of all other active proxy servers in the arrayed proxy server cluster;

generate a new list of all other active proxy servers in the arrayed proxy server cluster in response to a new proxy server activation or a proxy server deactivation; and expire the previous list of all other active proxy servers in the arrayed proxy server cluster in response to expiration of a next designated maximum state interval.

18. The computer program product of claim 15, where, in causing the computer to determine, in response to receipt of a message at a proxy server in an arrayed proxy server cluster, the list of potential active proxy servers in the arrayed proxy server cluster with the potential of stored processing state information associated with the received message, the computer readable program code when executed on the computer further causes the computer to hash a message identifier associated with the received message with a list of active proxy servers, where results of the hash of the message identifier with each active proxy server in the list of active proxy servers indicates active proxy servers with the potential of stored processing state information associated with the received message.

19. The computer program product of claim 18, where the computer readable program code when executed on the computer further causes the computer to, in response to determining that the proxy server that received the message is not on the list of potential active proxy servers with the potential of stored processing state information associated with the received message:

add the proxy server that received the message to a list of already visited proxy servers in a private header of the received message; and forward the received message to another active proxy server on the list of potential active proxy servers.

20. The computer program product of claim 15, where the computer readable program code when executed on the computer further causes the computer to, in response to determining the processing state information associated with the received message is stored in the local cache storage device, remove the private header of the received message.

* * * * *